M. & E. M. DEILLER.
CLUTCH.
APPLICATION FILED MAR. 28, 1912.

1,046,995. Patented Dec. 10, 1912.

Witnesses:

Inventors
Martin Deiller
Eugene M. Deiller
By their Attorney

UNITED STATES PATENT OFFICE.

MARTIN DEILLER AND EUGENE M. DEILLER, OF NEWARK, NEW JERSEY, ASSIGNORS TO UNIVERSAL TOBACCO MACHINE COMPANY, A CORPORATION OF NEW YORK.

CLUTCH.

1,046,995.   Specification of Letters Patent.   Patented Dec. 10, 1912.

Application filed March 28, 1912. Serial No. 686,783.

*To all whom it may concern:*

Be it known that we, MARTIN DEILLER and EUGENE M. DEILLER, citizens of the United States, residing at Newark, in the county of Essex and State of New Jersey, have invented a certain new and useful Improvement in Clutches, of which the following is a specification.

The invention is a clutch, and consists in the construction as hereinafter described.

Figure 1:
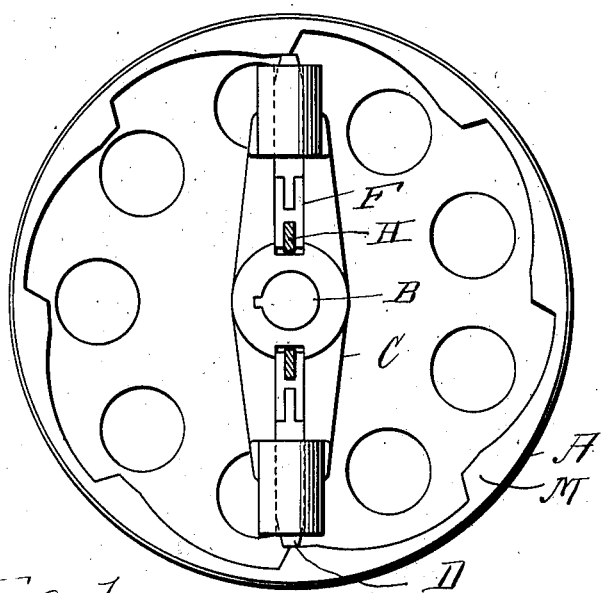
Figure 2:
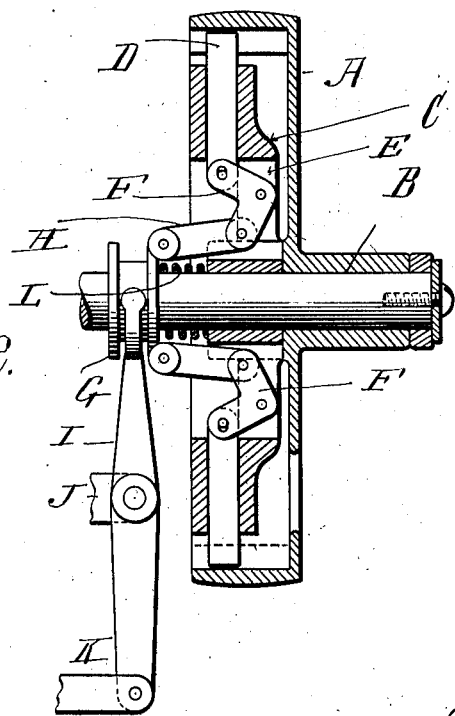

In the accompanying drawings—Figure 1 is a face view, and Fig. 2 is a diametral section of said clutch through the cross arm.

Similar numbers of reference indicate like parts.

A is a pulley to be driven by a suitable belt and loosely mounted on the shaft B. Said pulley is open on one side to receive a cross arm C which is keyed to shaft B, and in which are formed diametrically opposite radial slideways for the dogs D. In slots E of arm C are pivoted bell crank levers F, one arm of each lever being connected to a dog D, and the other arms being connected by links H to a sleeve G which slides on shaft B. Said sleeve has the usual groove to receive the bifurcated end of the clutch lever I. Lever I is pivoted to a fixed support, indicated at J, and operated by any suitable means, as the rod K. The dogs are normally held in engagement with the rim of pulley A by means of the helical spring L disposed between cross arm C and sleeve G, so that the motion from pulley A is thus communicated to shaft B. To release the clutch, rod K is moved to the left of Fig. 2, thus withdrawing said dogs from said rim.

As here shown, the dogs engage with rim projections or teeth M. If simply frictional engagement is desired, said teeth may be omitted.

We claim:

A clutch mechanism, comprising a shaft, a pulley loose thereon and open on one side, a cross arm within said pulley, having its hub fast on said shaft and having a radial slide-way and an opening between said slide-way and said hub, a dog in said slide-way, a sliding collar on said shaft, a bell-crank lever pivoted at its angle in said cross arm opening and having one arm pivoted to said dog, and a link pivoted at one end to the other arm of said bell-crank lever and at the other end to said collar; whereby when said collar is operated said dog is moved into or out of engagement with the rim of said pulley.

In testimony whereof we have affixed our signatures in presence of two witnesses.

MARTIN DEILLER.
EUGENE M. DEILLER.

Witnesses:
ANNA A. GULDNER,
CHAS. P. DAY.